Dec. 21, 1937.　　　C. A. HIRSCHBERG　　　2,102,706
DRILL FEEDING MECHANISM
Original Filed Feb. 19, 1936　　3 Sheets-Sheet 1
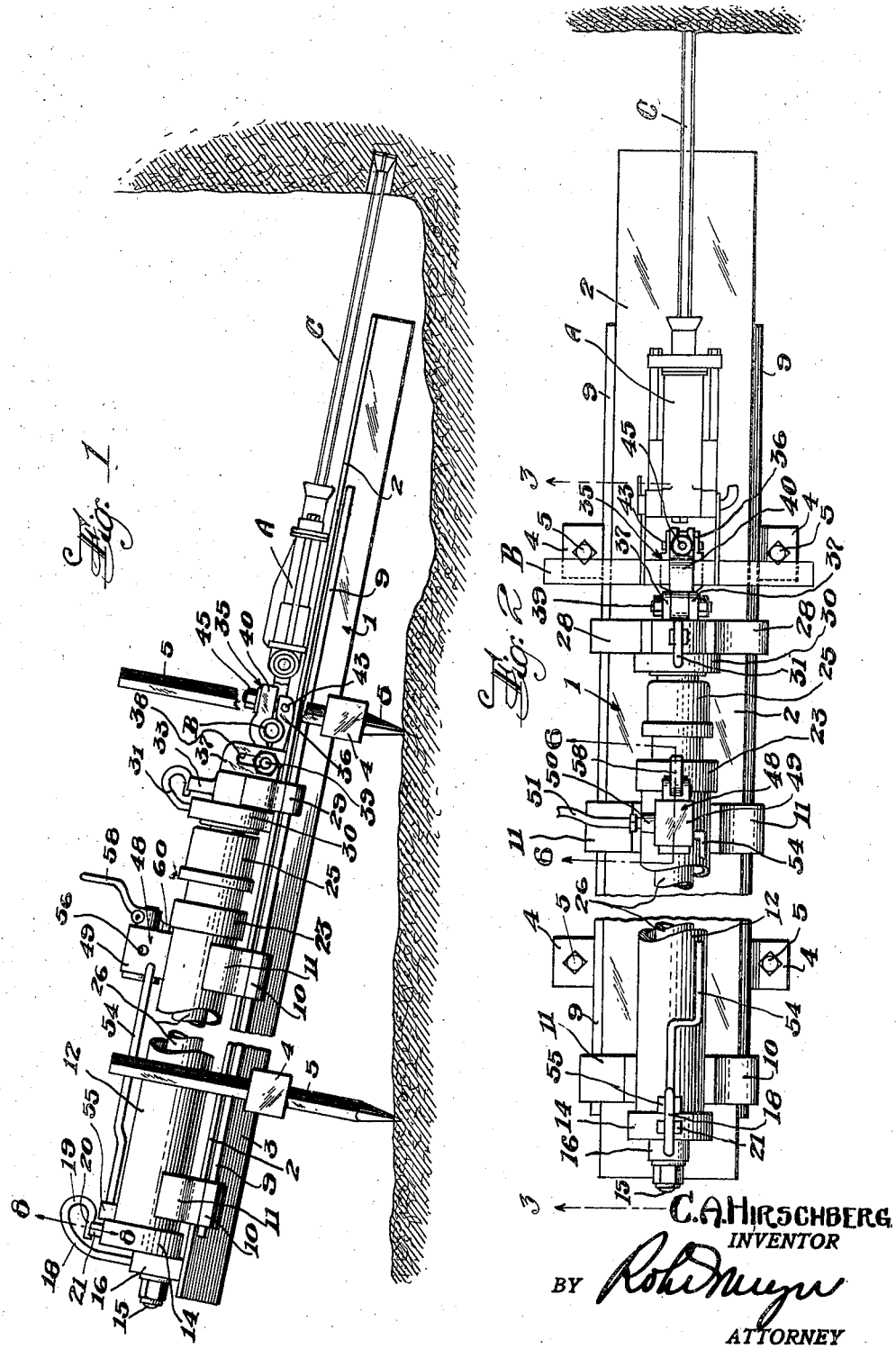
C. A. HIRSCHBERG
INVENTOR
BY
ATTORNEY

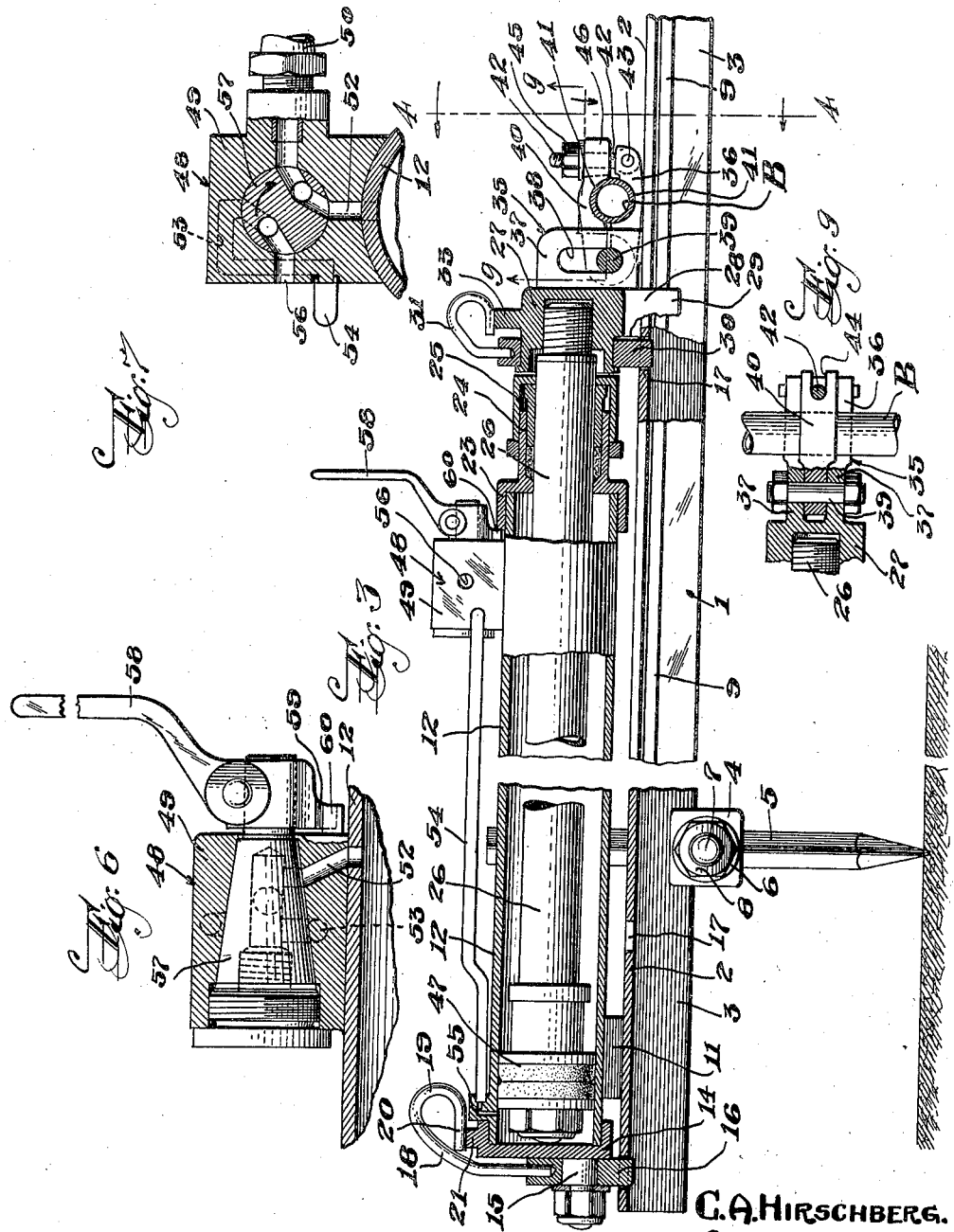

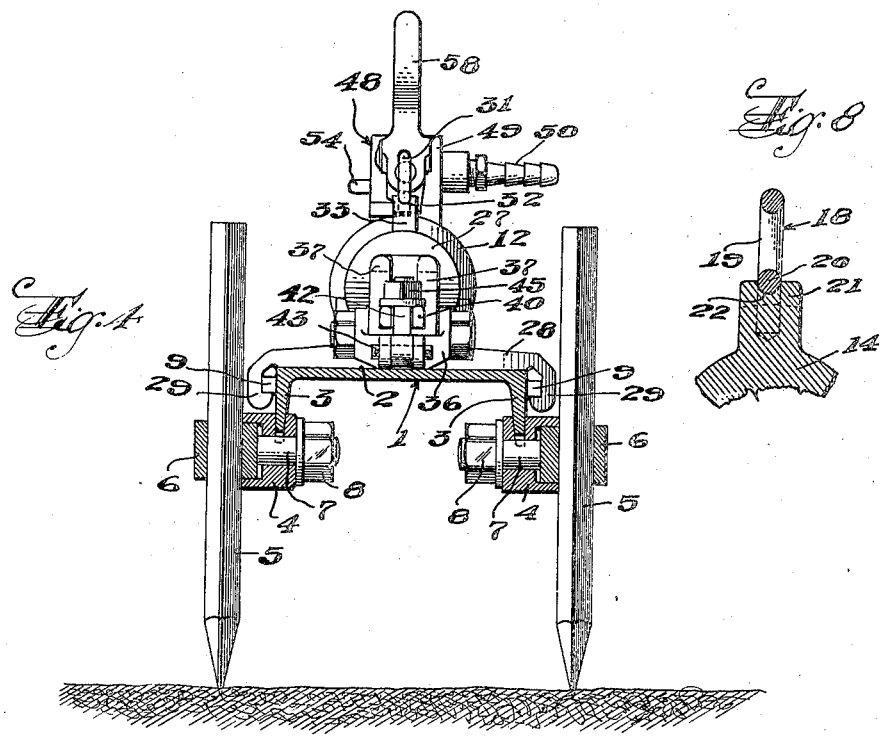
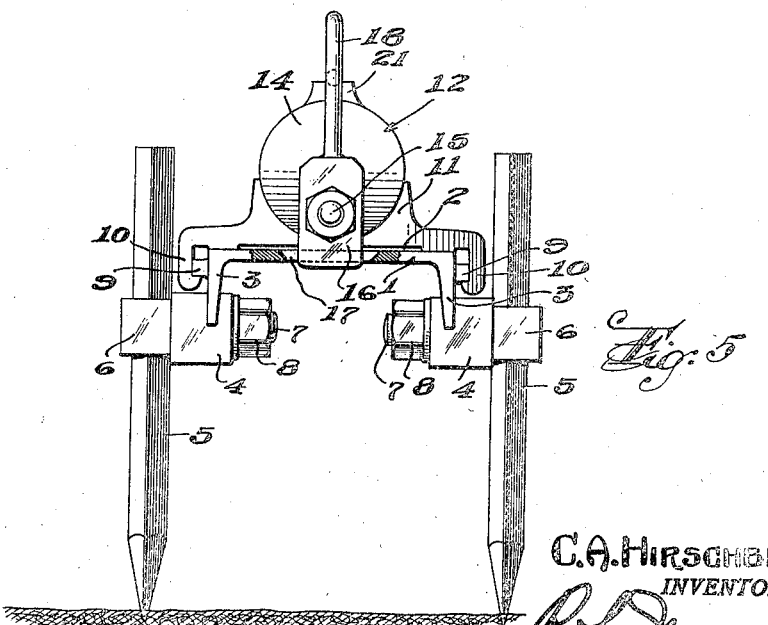

Patented Dec. 21, 1937

2,102,706

UNITED STATES PATENT OFFICE 2,102,706

DRILL FEEDING MECHANISM

Charles A. Hirschberg, Mountain Lakes, N. J., assignor to Worthington Pump and Machinery Corporation, Harrison, N. J., a corporation of Virginia Application February 19, 1936, Serial No. 64,790
Renewed May 18, 1937

32 Claims. (Cl. 255—51)

This invention relates to rock drills and more particularly to a mechanism for feeding a rock drill to its drilling work.

It has heretofore been the general practice in "snake-hole" drilling or in drilling holes horizontally or at slight angles to the horizontal near the bottom of a wall, quarry side, or analogous surface, to place the drill on a board or plank seat at the angle at which it is desired to drill the hole, the operator sits on the plank and pushes the drill as the drilling work progresses, by pressure of his feet on the handle or handles of the drill.

An object of the present invention is to provide a feeding mechanism which is particularly adapted for use in "snake-hole" or corresponding drilling which mechanism will securely hold a rock drill suitable for this type of drilling and gradually feed it to its drilling work by pressure of the pressure fluid employed for operating the drill, at a speed proportionate to the speed of drilling of the drill without assistance or attention by the operator.

Another object of the present invention is to provide a drill feeding mechanism of this type which is constructed and arranged so that any drill suitable for the type of drilling specified may be detachably connected thereto regardless of the make or size of the drill and without requiring any alterations to the feeding mechanism.

A still further object of the present invention is to provide a drill feeding mechanism as specified which includes means whereby, when the drill has been fed forwardly to the limit of the drilling capacity of the steel carried thereby or to the limit of the feeding capacity of the mechanism at one particular setting, the drill may be held stationary on the support and the feeding mechanism moved by pressure fluid into a new position for continuing the drilling operation, without requiring disconnecting of the drill and resetting of the feeding device.

The present invention comprehends the provision of a suitable support having a flat surface on which the rock drill rests and a two-way straight pneumatic feed cylinder which is slidable along the support into proper drill feeding position or for moving the drill to permit withdrawal of the drill steel from the drill hole. The feed cylinder is anchored by novel anchoring means to the support when it has been properly positioned for feeding the drill to its work. Adjustable anchoring supporting legs for the support proper are provided which permit quick and easy adjustment of the support to the angle desired for drilling and securely anchor the support at such angle and at the desired position.

With these and other objects in view, as may appear from the accompanying specification, the invention consists of various features of construction and combination of parts, which will be first described in connection with the accompanying drawings, showing a drill feeding mechanism of the preferred form embodying the invention, and the features forming the invention will be specifically pointed out in the claims.

In the drawings:

Figure 1 is a side elevation of the improved drilling mechanism having certain parts broken away.

Figure 2 is a top plan of the drilling mechanism.

Figure 3 is a longitudinal section through the drilling mechanism taken on the line 3—3 of Figure 2.

Figure 4 is a vertical section through the drill feeding mechanism taken on the line 4—4 of Figure 3.

Figure 5 is an end elevation of the rear end of the drill feeding mechanism showing part thereof in section.

Figure 6 is a detail longitudinal view through the valve mechanism which controls the operation of the drill feeding mechanism and taken on the line 6—6 of Figure 2.

Figure 7 is a cross-section through the valve mechanism showing the various ports and passages therein.

Figure 8 is a detail section taken on the line 8—8 of Figure 1.

Figure 9 is a detail horizontal view, partly in section taken on the line 9—9 of Figure 3.

Referring more particularly to the drawings, the improved drill feeding mechanism comprises the support 1 which is shown in the drawings in the form of a channel iron having a relatively broad flat portion 2 and depending side portions 3. The side portions 3 serve the dual functions of strengthening the support, and carrying the anchoring means for anchoring the support in various positions and at various desired angles with respect to the horizontal, as indicated or shown in Figure 1 of the drawings.

The anchoring and adjusting means comprise collars 4 which are carried by the depending sides 3 at suitably spaced points, preferably a pair of them being positioned near the rear end of the support with a second pair positioned forwardly thereof towards the front end of the support. Anchoring pins 5 are provided which may be of any configuration in cross-section, but are preferably rectangular, and they extend through clamping collars 6. The clamping collars 6 are adjustably carried by the carrying collars 4 and have bolt extensions 7 formed thereon on which clamping nuts 8 are threaded. The anchoring pins 5 extend through the clamping collar 6 transversely of the bolts 7 and when it is desired to adjust either the heights or the angles of the anchoring pins 5 with respect to the vertical, the nuts 8 are loosened and the anchoring pins set as desired, after which the nuts 8 are tightened on the bolts 7 to securely clamp the anchoring pins 5 against the outer sides of the carrying collars 4 to securely hold the anchoring pins in position and consequently securely anchor the support 1 at any desired position with its upper flat surface 2 at any desired angle with respect to the horizontal permitted by the lengths of the anchoring pins 5.

The sides 3 of the support 1 have guides 9 formed on their sides in any suitable manner, preferably by welding thereto for the purposes of economical construction. The guides 9 extend substantially the full length of the support as clearly shown in Figures 1 and 2 of the drawings and their outer sides and under surfaces are engaged by guide dogs 10. The guide dogs 10 are attached in any suitable manner by suitable attaching brackets 11 to the feed cylinder 12 thereby providing means for slidably connecting the cylinder 12 to the supporting structure 1 for supporting the cylinder on the supporting structure 1 in such manner as to permit its movement to various desired positions along the flat upper surface 2 of the support.

The rear end of the cylinder 12 is closed by a suitable closure 14 which has a trunnion 15 formed or mounted thereon. The trunnion 15 serves as a pivotal support for the locking dog 16 which serves to lock the cylinder 12 in various adjusted positions along the support 1. The locking dog 16 is, as clearly shown in Figure 5 of the drawings, rectangular in shape and it moves, in its pivotal movement, transversely of the axis of the cylinder 12, moving into any one of a series of slots 17 formed at spaced intervals in the flat portion 2 of the support 1. The width of the slots 17 is such as to provide longitudinal movement of the cylinder when the locking dog 16 is engaged therein as shown in Figures 3 and 5 and their lengths are such as to permit the locking dog to be swung on its pivot 15 out of any one of the slots to permit movement of the cylinder 12 relative to the support 1.

For facilitating the swinging movement of the locking dog 16 and also for holding the locking dog 16 in cylinder locking position so as to prevent movement of the locking dog relative to the support 1 under vibration caused by the operation of the drill feeding mechanism, a suitable combined operating and locking handle 18 is attached to the locking dog. The locking handle 18 is curved around to form an operating or engaging portion 19 which terminates in the latch or locking portion 20. The cap 14 has an extension 21 formed thereon which is provided with a recess 22 into which the portion 20 of the handle 18 springs to prevent jiggling or movement of the locking dog 16 under vibration caused by operation of the drill feeding mechanism. The recess or notch 22 is, however, shallow enough to permit the handle 18 to be moved by manual pressure without excessive exertion.

The forward end of the cylinder 12 is closed by a closure cap 23 which has a cylindrical extension 24 formed thereon. The extension 24 cooperates with the second cap 25 to form a packing enclosure for packing or sealing the forward end of the cylinder about the piston rod 26 to prevent leakage of pressure fluid past the forward end of the piston rod.

The piston rod 26 has a carrying or connecting member 27 detachably connected to its forward end. The carrying member 27 has a bracket 28 carried thereby which in turn carries guiding dogs 29. The guiding dogs 29 engage the guides 9 to form a guiding support for the forward end of the piston 26. The carrying member 27 has a locking dog 30 carried thereby which is similar in construction to the locking dog 16 and engages in the openings 17 in the supporting member 1. The locking dog 30 has a handle 31 attached thereto the free end of which engages in a notch 32 in the extension 33 for holding the locking dogs against jiggling movement during the operation of the drill feeding mechanism. The handle 31 engages against the sides of the extension 33 to prevent the locking dog from dropping into locking position when it is desired to keep the locking dog out of locking engagement in any one of the grooves 17 for the purpose as will be hereinafter more fully set forth.

The carrying member 27 has an attaching structure 35 carried thereby by means of which a rock drill of any suitable type, as indicated at A may be attached or connected to the piston rod 26 for movement therewith. The attaching structure 35 comprises a lower jaw 36 which is rigidly or movably connected to the carrying member 27 and has a pair of spaced uprights 37 formed thereon. The spaced uprights 37 have elongated slots 38 extending vertically therein in which slots rides the pivot pin 39 for the upper movable jaw 40. The jaws 36 and 40 are provided with transversely extending concave portions 41 which rest therein over the handle B of the rock drill A. A locking bolt 42 is pivotally carried as shown at 43 by the stationary jaw 36 and it engages in a slot 44 formed in the free end of the pivot jaw 40. A clamping nut 45 is threaded on the locking bolt 42 and clamps against the upper flat surface of the slotted locking extension 46 of the pivoted jaw 40 for securely clamping and holding the handle B of the rock drill A connected to the attaching structure 35. The slots 38 permit variation of the distance between the facing surfaces of the jaws 36 and 40 so as to permit the attachment to the carrying member 27 of the handle of a rock drill regardless of the size of the handle of the rock drill, the limits being provided only by the lengths of the slots 38 and of the locking bolt 42. It is to be understood of course that the handles of rock drills suitable for the type of drilling above referred to do not vary in size to any material extent, regardless of the make of the drill, since all of such handles are made to be gripped by the hands of the operator.

The piston rod 26 has a piston 47 thereon which piston reciprocates in the cylinder 12. The piston 47 is reciprocated in the cylinder 12 under action of any suitable type of pressure fluid, preferably the same pressure fluid as is utilized for operating the rock drill A. This pressure fluid is supplied from any suitable source (not shown) and its delivery to the piston 12 and its exhaust therefrom is controlled by the valve structure 48.

While in the drawings, a particular type of valve structure 48 is shown, it is to be understood that any suitable type of valve structure which will provide the necessary control, may be employed without departing from the spirit of the present invention.

The valve structure 48 includes the valve chest 49 which has a suitable coupling 50 connected thereto by means of which coupling the valve chest may be connected to the pressure fluid supply source (not shown) by a suitable hose or the like as indicated at 51.

The valve chest 49 has a passage 52 formed therein which leads into the front end of the cylinder 12 and a second passage 53 therein which connects to an outlet 54. The outlet 54 leads to the rear end of the cylinder 12 and opens into the rear end of the cylinder through a suitable passage 55. An exhaust port 56 which opens to atmosphere is also provided in the valve chest 49. A rotary valve 57 is carried by the valve chest 49 and is rotated through the medium of a handle 58, for positioning the valve 57 to control the flow of the operating pressure fluid through the valve structure 48 and to the cylinder. For instance, when the passage 52 is connected through the valve 57 to the incoming pressure fluid (as shown in Figure 7 in the drawings) for feeding pressure fluid to the front end of the cylinder 12, the rear end of the cylinder will be open to exhaust through the valve 57 and the exhaust port 56. When the valve 57 is shifted so as to bring the port 53 in communication with the supply of pressure fluid to deliver pressure fluid to the rear end of the cylinder, the front end of the cylinder will be connected to exhaust through the valve 57 and the exhaust port 56.

The limits of movement of the valve 57 are controlled by a stop 59 associated with a handle 58 which engages suitable stops 62 carried by the valve shaft 49.

In operation when it is desired to drill a "snakehole" or a hole at a slight angle to the horizontal, the supporting structure 1 with the cylinder 12 and its companion parts mounted thereon is moved in proximity to the place where the hole is to be drilled and the anchoring pins 5 are adjusted, first to regulate the angle of the upper flat surface of the support 1 to correspond with the angle at which the hole is to be drilled and to anchor the drilling mechanism in the desired position and at the desired angle. The rock drill A may or may not have been attached to the piston rod 26 prior to such positioning, but after the drill feeding mechanism has been properly positioned the cylinder 12 is moved to the rear end of the supporting structure where it is locked in position by means of the locking dog 16, with the piston 47 at the rear end of the cylinder as shown in Figure 3 of the drawings. The valve 57 is then operated to permit the flow of the pressure fluid into the rear end of the cylinder. The pressure fluid acting upon the piston 47 will force the piston 47, piston rod 26, carrying member 27 and the rock drill A forwardly along the flat upper surface 2 of the support 1 feeding the drill A forwardly as the drill steel shown at C cuts or drills into the surface being drilled. During the drilling operation and the feeding of the drill to its work the dog 30 is disengaged or that is it is moved out of locking position to the support 1.

When the drill A has been fed forwardly to the limit of movement of the piston 47 in the cylinder 12 and it is desired to drill the drill hole further or deeper, the locking dog 30 is moved into locking position in one of the openings 17 and the locking dog 16 is moved out of locking position. This locks the piston 47, piston rod 26 and the rock drill A against movement relative to the support 1 and releases the cylinder 12 for movement relative to the support 1. The valve 57 is then operated to feed the pressure fluid into the forward end of the cylinder and such pressure fluid acting on the forward end of the cylinder and the piston 47 which is locked in position, will move the cylinder forwardly over the piston until the rear end of the cylinder reaches the piston. The locking dog 30 is then moved out of locking position and the locking dog 16 is moved into locking position after which the valve 57 is operated to feed the pressure fluid to the rear end of the cylinder and the drilling and drill feeding operation is continued.

When it is desired to withdraw the drill steel from the drill hole, the cylinder 12 is left locked with respect to the support 1 and the valve 57 is operated to feed the pressure fluid to the front end of the cylinder. The pressure fluid entering the front end of the cylinder will force the piston 47 towards the rear end of the cylinder and move the rock drill A rearwardly, withdrawing the drill steel C from the drill hole.

From the foregoing description taken in connection with the accompanying drawings, it will be apparent that a drill-feeding mechanism has been provided by means of which a rock drill or any other suitable tool may be fed to its work, as the work progresses and with a minimum amount of manual labor. Also the improved drill feeding mechanism will permit its resetting for continued feeding of a drill after it has once reached the limit of its feeding capacity and also the withdrawal of the drill steel from a drill hole with minimum manual effort.

In the drawings and in the foregoing description, the support 1 is illustrated and described as having a flat upper surface, but it is of course to be understood that the invention is not limited to a flat surface but may be any similar or suitable shape desired without departing from the spirit of the invention.

While the improved drill feeding mechanism has been shown and described as particularly adaptable for drilling "snake holes" it is to be understood that the present invention does not limit the feeding mechanism to this particular type of work but that it may be used wherever applicable without departing from the spirit of the invention.

It will be understood that the invention is not to be limited to the specific construction or arrangement of parts shown but that they may be widely modified within the invention defined by the claims.

What is claimed is:

1. In a drill feeding mechanism, a support, a two-way pneumatic feed cylinder slidable on said support, a piston in said cylinder, releasable means for holding said piston against movement relative to the support, a valve for controlling delivery of pressure fluid to the cylinder for moving the cylinder on the support, and means for locking said cylinder in adjusted positions on said support.

2. In a drill feeding mechanism, a support, a pneumatic feed cylinder slidable on said support, a piston in said cylinder, releasable means for holding said piston against movement relative to the support, a valve for controlling the delivery of pressure fluid to the cylinder for moving the cylinder on the support, means for locking said cylinder in adjusted positions on said support, guides formed on said support, and means on said cylinder engaging said guides for guiding movement of the cylinder.

3. In a drill feeding mechanism, a support, a two-way pneumatic feed cylinder slidable on said support, a piston movable in said feed cylinder, releasable means for holding said piston against movement relative to the support, a valve for controlling delivery of pressure fluid to the cylinder for moving the cylinder on the support, and means for connecting a rock drill to said piston.

4. In a drill feeding mechanism, a support, a pneumatic feed cylinder slidable on said support, a piston in said cylinder, releasable means for holding said piston against movement relative to the support, a valve for controlling delivery of pressure fluid to the cylinder for moving the cylinder on the support, means for locking said cylinder in adjusted positions on said support, and means for guiding said cylinder along said support.

5. In a drill feeding mechanism, a support, a two-way pneumatic feed cylinder slidable on said support, means for locking said cylinder in adjusted positions on said support, a piston movable in said cylinder, and locking means for locking said piston against movement relative to said support.

6. In a drill feeding mechanism, a support, a two-way pneumatic feed cylinder slidable on said support, a piston movable in said feed cylinder, means for connecting a rock drill to said piston, guides formed on said support, guiding dogs engaging said guides, and means connecting said guiding dogs to said piston.

7. In a drill feeding mechanism, a flat support, a two-way pneumatic feed cylinder slidable on said support, a valve for controlling delivery of pressure fluid to the cylinder for moving the cylinder on the support, means for locking the cylinder in adjusted positions, a piston movable in said feed cylinder, releasable means for holding said piston against movement relative to said support, means for connecting a rock drill to said piston, guides formed on said support, guiding dogs engaging said guides, and means connecting said guiding dogs to said cylinder.

8. In a drill feeding mechanism, a flat support, a two-way pneumatic feed cylinder slidable on said support, a piston movable in said feed cylinder, means for connecting a rock drill to said piston, locking means for locking said cylinder in adjusted positions on said support, and locking means for locking said piston against movement relative to said support.

9. In a drill feeding mechanism, a support, a pneumatic feed cylinder slidable on said support, means controlling delivery of cylinder moving pressure fluid to said cylinder, a piston movable in said cylinder, releasable means for holding said piston against movement relative to said support, means for locking said cylinder in adjusted positions on the support, and anchoring legs adjustably carried by said support for adjusting the angle of said support and anchoring it in position.

10. In a drill feeding mechanism, a support, a two-way pneumatic feed cylinder slidable on said support, a piston movable in said feed cylinder, means for connecting a rock drill to said piston, guides formed on said support, guiding dogs engaging said guides and means connecting said guiding dogs to said piston, and anchoring legs carried by said support for adjusting the angle of the support and anchoring it in position.

11. In a drill feeding mechanism, a flat support, a two-way pneumatic feed cylinder slidable on said support, locking means for locking said cylinder in adjusted positions on said support, locking means for locking said piston against movement relative to said support, and means for holding said locking means in piston locking position.

12. In a drill feeding mechanism, a support, a feed cylinder slidably carried by said support, a piston in said cylinder and movable therein, means for locking said cylinder against movement to permit movement of the piston relative to the cylinder, and means to lock the piston against movement to permit movement of the cylinder relative to the piston.

13. In a drill feeding mechanism, a support, a valve for controlling delivery of pressure fluid to said cylinder for moving the cylinder at predetermined times and moving the piston at other times, and means for locking said cylinder in adjusted positions on the support, a feed cylinder slidably carried by said support, a piston in said cylinder and movable therein, releasable means for holding said piston against movement relative to the support, a piston rod connected to said piston, and an adjustable clamp connected to said piston rod for connecting a rock drill thereto.

14. In a drill feeding mechanism, a support, a feed cylinder slidably carried by said support, a piston in said cylinder and movable therein, a piston rod connected to said piston, releasable means for locking said cylinder against movement relative to said support, and releasable means connected to said piston rod to lock the piston, and piston rod against movement relative to said support.

15. In a drill feeding mechanism, a support, a feed cylinder slidably carried by said support, a piston in said cylinder and movable therein, a piston rod connected to said piston, releasable means for locking said cylinder against movement relative to said support, releasable means connected to said piston rod to lock the piston, and piston rod against movement relative to said support, and a single valve for controlling the delivery of pressure fluid to the opposite ends of said cylinder for moving the piston to feed a drill to or from its work when the cylinder is locked against movement and to move the cylinder along the support when the piston is locked against movement and the cylinder released.

16. In a drill feeding mechanism, a flat support, a two-way pneumatic feed cylinder slidable on said support, a piston movable in said cylinder for feeding a tool to or from its work, means for locking said cylinder against movement relative to the support, means for locking the piston against movement relative to the support, a valve for controlling the delivery of operating pressure fluid to the opposite ends of said cylinder for moving the piston when the cylinder is locked against movement relative to the support and to move the cylinder along the support when the piston is locked against movement relative to the support.

17. In a drill feeding mechanism, a support, a two-way pneumatic feed cylinder slidable on said support, a piston movable in said cylinder for feeding a tool to or from its work, means for locking said cylinder against movement relative to the support, means for locking the piston against movement relative to the support, a valve for controlling the delivery of operating pressure fluid to the opposite ends of said cylinder for moving the piston when the cylinder is locked against movement relative to the support and to move the cylinder along the support when the piston is locked against movement relative to the support, and adjustable clamping means for connecting a rock drill to said piston.

18. In a drill feeding mechanism, a support, a two-way pneumatic feed cylinder slidable on said support, a piston movable in said cylinder for feeding a tool to or from its work, means for locking said cylinder against movement relative to the support, means for locking the piston against movement relative to the support, a valve for controlling the delivery of operating pressure fluid to the opposite ends of said cylinder for moving the piston when the cylinder is locked against movement relative to the support and to move the cylinder along the support when the piston is locked against movement relative to the support, and anchoring means adjustably carried by said support and adjustable to vary the angle of the support and to anchor it in position.

19. In a drill feeding mechanism, a support, a pneumatic feed cylinder slidable on said support, a piston movable in said cylinder for feeding a tool to or from its work, means for locking said cylinder against movement relative to said support, means for locking said piston against movement relative to the support, a valve for controlling the delivery of operating pressure fluid to said cylinder for moving the piston when the cylinder is locked against movement relative to the support and to move the cylinder along the support when the piston is locked against movement relative to the support, anchoring means, adjustable means connected to said piston for detachably connecting a tool thereto, anchoring means carried by said support, said anchoring means adjustable to vary the angle of the cylinder supporting face of the support.

20. In a drill feeding mechanism, a support, a feed cylinder slidably carried by said support, a piston in said cylinder and movable therein, a piston rod connected to said piston, releasable means for locking said cylinder against movement relative to said support, and releasable means connected to said piston rod to lock the piston, and piston rod against movement relative to said support, a single valve for controlling the delivery of pressure fluid to the opposite ends of said cylinder for moving the piston to feed a drill to or from its work when the cylinder is locked against movement and to move the cylinder along the support when the piston is locked against movement and the cylinder released, and anchoring means carried by said support, said anchoring means adjustable to vary the angle of the cylinder supporting face of the support.

21. In a drill feeding mechanism, a support, a feed cylinder slidably carried by said support, a piston in said cylinder and movable therein, a piston rod connected to said piston, releasable means for locking said cylinder against movement relative to said support, and releasable means connected to said piston rod to lock the piston and piston rod against movement relative to said support, a single valve for controlling the delivery of pressure fluid to the opposite ends of said cylinder for moving the piston to feed a drill to or from its work when the cylinder is locked against movement and to move the cylinder along the support when the piston is locked against movement and the cylinder released, means for holding said cylinder locking means against accidental movement, and means for holding said piston locking means against accidental movement.

22. In a drill feeding mechanism, a support, a feed cylinder slidably carried by said support, a piston in said cylinder and movable therein, a piston rod connected to said piston, releasable means for locking said cylinder against movement relative to said support, releasable means connected to said piston rod to lock the piston and piston rod against movement relative to said support, guides formed on said support, and means on said cylinders engaging said guides for guiding movement of the cylinder.

23. In a drill feeding mechanism, a support, a feed cylinder slidably carried by said support, a piston in said cylinder and movable therein, a piston rod connected to said piston, releasable means for locking said cylinder against movement relative to said support, releasable means connected to said piston rod to lock the piston and piston rod against movement relative to said support, a single valve for controlling the delivery of pressure fluid to the opposite ends of said cylinder for moving the piston to feed a drill to or from its work when the cylinder is locked against movement and to move the cylinder along the support when the piston is locked against movement and the cylinder released, guides on said supporting structure and means carried by said cylinder and engaging said guides for guiding the movement of the cylinder.

24. In a drill feeding mechanism, a support, a feed cylinder slidably carried thereby, a piston in said cylinder and movable therein, a piston rod connected to said piston, a carrying member detachably connected to one end of said piston rod, guiding dogs connected to said carrying member and engaging said support for guiding movement of the piston rod, a drill handle engaging jaw carried by said carrying member, an adjustable drill handle engaging jaw pivotally and adjustably carried by said carrying member, and means for locking said jaws in drill handle gripping position.

25. In a drill feeding mechanism, a support, a feed cylinder slidably carried thereby, a piston in said cylinder and movable therein, a piston rod connected to said piston, a carrying member detachably connected to one end of said piston rod, guiding dogs connected to said carrying member and engaging said support for guiding movement of the piston rod, a drill handle engaging jaw carried by said carrying member, an adjustable drill handle engaging jaw pivotally and adjustably carried by said carrying member, means for locking said jaws in drill handle gripping position, and means on said carrying member for locking the carrying member, piston and piston rod against movement relative to said support.

26. In a drill feeding mechanism, a support provided with a plurality of openings therein spaced at predetermined points along its length, a pneumatic feed cylinder slidable on said support, a pivoted locking dog carried by said cylinder for engagement at any one of said openings to lock the cylinder in adjusted positions along the support, a piston in said cylinder, and releasable means for holding said piston against movement relative to the support.

27. In a drill feeding mechanism, a support, a pneumatic feed cylinder slidable on said support, means for locking said cylinder in adjusted positions on said support, a piston in said cylinder, said support provided with a plurality of openings therein at predetermined points along its length, and a swinging locking dog connected to said piston for engagement in any one of said openings to lock said piston against movement relative to the support.

28. In a drill feeding mechanism, a support provided with a plurality of openings therein spaced at predetermined points along its length, a pneumatic feed cylinder slidable on said support, a pivoted locking dog carried by said cylinder for engagement at any one of said openings to lock the cylinder in adjusted positions along the support, a piston in said cylinder, releasable means for holding said piston against movement relative to the support, and means carried by said locking dog for engagement with said cylinder to hold said locking dog against accidental movement.

29. In a drill feeding mechanism, a support provided with a plurality of openings therein spaced at predetermined points along its length, a pneumatic feed cylinder slidable on said support, a pivoted locking dog carried by said cylinder for engagement at any one of said openings to lock the cylinder in adjusted positions along the support, a piston in said cylinder, releasable means for holding said piston against movement relative to the support, and anchoring legs adjustably carried by said support for anchoring the support at various angles relative to the horizontal.

30. In a drill feeding mechanism, a support, a pneumatic feed cylinder slidable on said support, a piston in said cylinder, releasable means for holding said piston against movement relative to said support, means for locking said cylinder in adjusted positions on the support, and a plurality of anchoring legs carried by said support for pivotal and longitudinal adjustment relative to the support for anchoring the support at various angles relative to the horizontal.

31. In a drill feeding mechanism, a support, a pneumatic feed cylinder slidable on said support, a piston in said cylinder, releasable means for holding said piston against movement relative to said support, means for locking said cylinder in adjusted positions on the support, a plurality of anchoring legs carried by said support for pivotal and longitudinal adjustment relative to the support for anchoring the support at various angles relative to the horizontal, and releasable means for detachably connecting a rock drill to said piston.

32. In a drill feeding mechanism, a support, a pneumatic feed cylinder slidable on said support, means controlling the delivery of cylinder moving pressure fluid to said cylinder, a piston movable in the cylinder, releasable means for holding said piston against movement relative to the support, means for locking said cylinder in adjusted positions on said support, and adjustable means on said support for regulating the angle of the support with respect to the horizontal.

CHARLES A. HIRSCHBERG.